(12) United States Patent
Doi et al.

(10) Patent No.: US 11,569,551 B2
(45) Date of Patent: Jan. 31, 2023

(54) BUSBAR MODULE

(71) Applicants: YAZAKI CORPORATION, Tokyo (JP); TOYOTA JIDOSHA KABUSHIKI KAISHA, Toyota (JP)

(72) Inventors: Masamichi Doi, Kakegawa (JP); Shinichi Yanagihara, Kakegawa (JP); Masaki Shimada, Kariya (JP); Shuta Ito, Toyota (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 152 days.

(21) Appl. No.: 17/222,020

(22) Filed: Apr. 5, 2021

(65) Prior Publication Data

US 2021/0313655 A1 Oct. 7, 2021

(30) Foreign Application Priority Data

Apr. 7, 2020 (JP) .............................. JP2020-069182

(51) Int. Cl.
*H01M 50/507* (2021.01)

(52) U.S. Cl.
CPC ...... *H01M 50/507* (2021.01); *H01M 2220/20* (2013.01)

(58) Field of Classification Search
None
See application file for complete search history.

(56) References Cited

U.S. PATENT DOCUMENTS

| 9,209,550 B2 * | 12/2015 | Kinoshita ........... H01M 50/569 |
| 2012/0164509 A1 * | 6/2012 | Ogasawara ......... H01M 50/522 |
| | | 439/212 |
| 2017/0125956 A1 * | 5/2017 | Kato ..................... H01R 11/28 |
| 2018/0166673 A1 | 6/2018 | Kataoka et al. |

FOREIGN PATENT DOCUMENTS

| JP | 2017107801 A * | 6/2017 |
| JP | 2018-97987 A | 6/2018 |

OTHER PUBLICATIONS www.espacenet.com machine translation of the detailed description of JP 2017-107801A. (Year: 2017).*

* cited by examiner

*Primary Examiner* — Gregg Cantelmo
(74) *Attorney, Agent, or Firm* — Sughrue Mion, PLLC

(57) ABSTRACT

A busbar module includes a case to be attached to a battery assembly, busbars and electric wires having a connection end to be connected to the busbars. The case includes busbar accommodation portions to accommodate the busbars and an electric wire routing groove portion to accommodate the electric wires. The electric wire routing groove portion includes a connection end accommodation portion to accommodate the connection end, an accommodation portion cover and an electric wire lead-out portion configured such that the electric wires are drawn out from the connection end accommodation portion toward a direction. An outer surface of the accommodation portion cover is to form a bottom surface of a routing path configured such that the electric wires drawn out from the connection end accommodation portion extend in the routing path.

4 Claims, 7 Drawing Sheets

BUSBAR MODULE

CROSS-REFERENCE TO RELATED APPLICATION

The present application claims priority to Japanese Patent Application No. 2020-069182 filed on Apr. 7, 2020, the entire content of which is incorporated herein by reference.

TECHNICAL FIELD

The present invention relates to a busbar module.

BACKGROUND

A power supply device mounted on various vehicles such as an electric automobile that travels using an electric motor and a hybrid automobile that travels using an engine and an electric motor in combination includes a busbar module having a plurality of busbars to be connected to electrodes of a plurality of single batteries.

A related art busbar module includes a plurality of electric wires for voltage detection electrically connected to the busbars in order to detect voltages of the single batteries, and these electric wires are accommodated and routed in electric wire routing groove portions arranged along an arrangement direction of a plurality of busbar accommodation portions in which the busbars are accommodated (for example, see JP2018-97987A). In the related art busbar module (conductive module), an accommodation portion of a connection end of an electric wire (wire-shaped conductor) with each of the busbars is provided between a busbar accommodation portion (accommodation space portion) and an electric wire routing groove portion (wiring space portion), and the electric wire on a downstream is disposed so as not to interfere with the connection end of the electric wire on an upstream.

In the above busbar module, when the electric wires for the voltage detection are routed, a complicated bending operation is required in which the electric wire connected to the busbar is bent, guided into the electric wire routing groove portion, and accommodated along the electric wire routing groove portion. Therefore, it takes time and effort to perform a routing operation of the electric wire.

In addition, in the above busbar module, in a plan view, since the accommodation portion of the connection end of the electric wire with each of the busbars is provided between the busbar accommodation portion and the electric wire routing groove portion, and the electric wire on the downstream is disposed so as not to interfere with the connection end of the electric wire on the upstream, a width dimension of the busbar module is increased.

SUMMARY

Illustrative aspects of the present invention provide a busbar module configured to improve routing workability of an electric wire while reducing a size of the busbar module.

According to an illustrative aspect of the present invention, a busbar module includes a case to be attached to a battery assembly including a plurality of single batteries, the case having a first end and a second end in a longitudinal direction of the case, a plurality of busbars supported by the case and configured to be connected to electrodes of the plurality of single batteries and a plurality of electric wires each having a connection end configured to be electrically connected to each of the plurality of busbars. The case includes a busbar accommodation row portion in which a plurality of busbar accommodation portions each configured to accommodate each of the plurality of busbars are arranged in a row along the longitudinal direction and an electric wire routing groove portion extending along the busbar accommodation row portion and configured to accommodate at least one of the plurality of electric wires such that the at least one of the plurality of electric wires is routed toward a direction oriented from the second end toward the first end of the case. The electric wire routing groove portion includes a connection end accommodation portion having a concave shape and configured to accommodate the connection end, an accommodation portion cover provided on the connection end accommodation portion in an openable and closable manner with respect to the connection end accommodation portion and configured to cover an upper portion of the connection end accommodation portion and an electric wire lead-out portion provided on an end of the connection end accommodation portion in the direction and configured such that each of the plurality of electric wires is drawn out from the connection end accommodation portion toward the direction with the connection end being accommodated in the connection end accommodation portion. An outer surface of the accommodation portion cover is configured to, when the accommodation portion cover covers the upper portion of the connection end accommodation portion, form a bottom surface of a routing path, the routing path being configured such that each of the plurality of electric wires drawn out from the connection end accommodation portion extend in the routing path.

Other aspects and advantages of the invention will be apparent from the following description, the drawings and the claims.

BRIEF DESCRIPTION OF DRAWINGS

FIGS. 5A and 5B are diagrams showing an attaching operation of a busbar to a busbar accommodation portion of a case, in which FIG. 5A is a plan view of the case, and FIG. 5B is a cross-sectional view taken along a line B-B in FIG. 5A;

FIGS. 6A and 6B are diagrams showing an attaching operation of the busbar to the busbar accommodation portion of the case, in which FIG. 6A is a plan view of the case, and FIG. 6B is a cross-sectional view taken along a line C-C in FIG. 6A; and FIGS. 7A and 7B are diagrams showing an attaching operation of the busbar to the busbar accommodation portion of the case, in which FIG. 7A is a plan view of the case, and FIG. 7B is a cross-sectional view taken along a line D-D in FIG. 7A.

DESCRIPTION OF EMBODIMENTS

Figure 1:
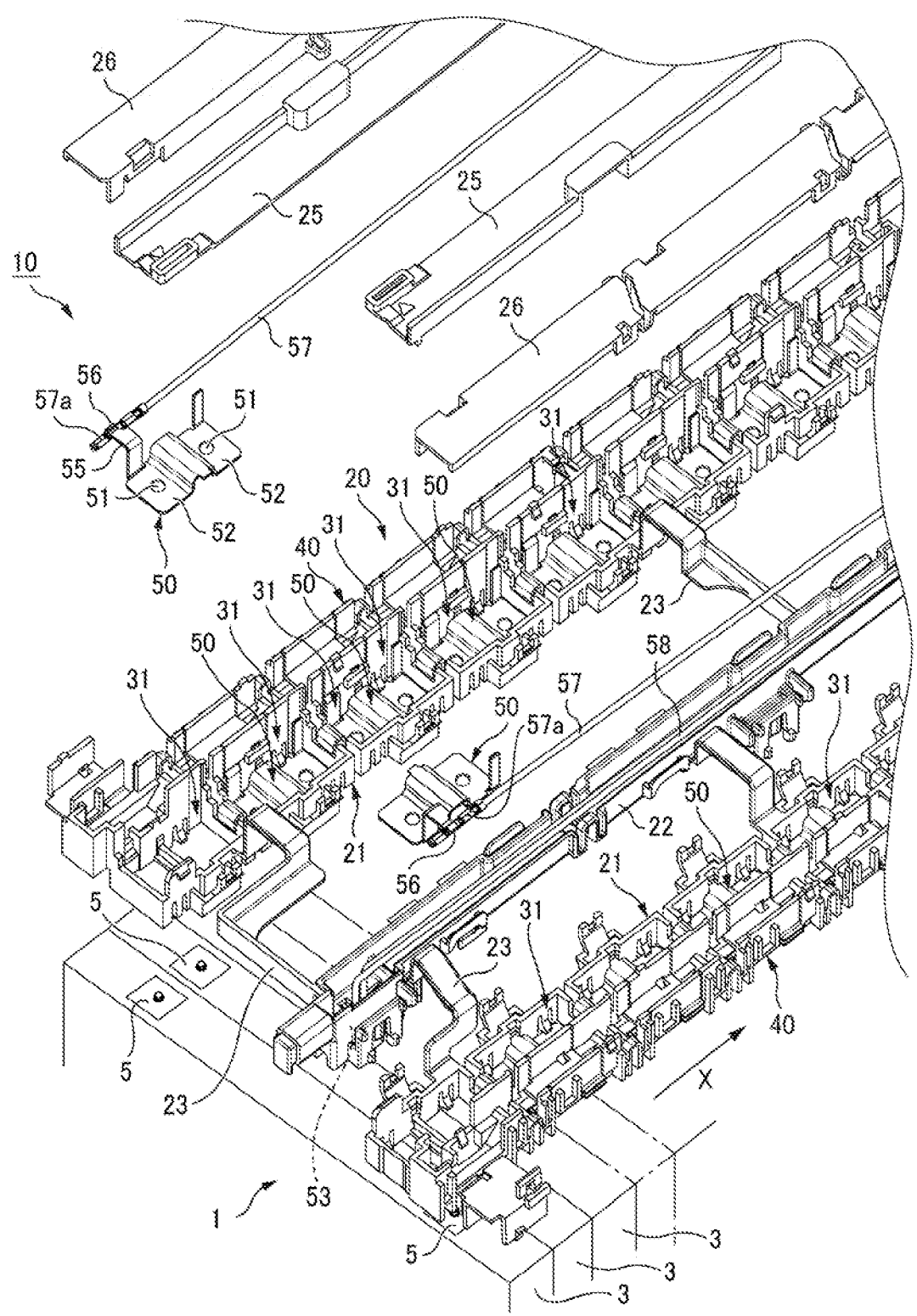
FIG. 1 is an exploded perspective view of a busbar module according to an embodiment.
Figure 2:
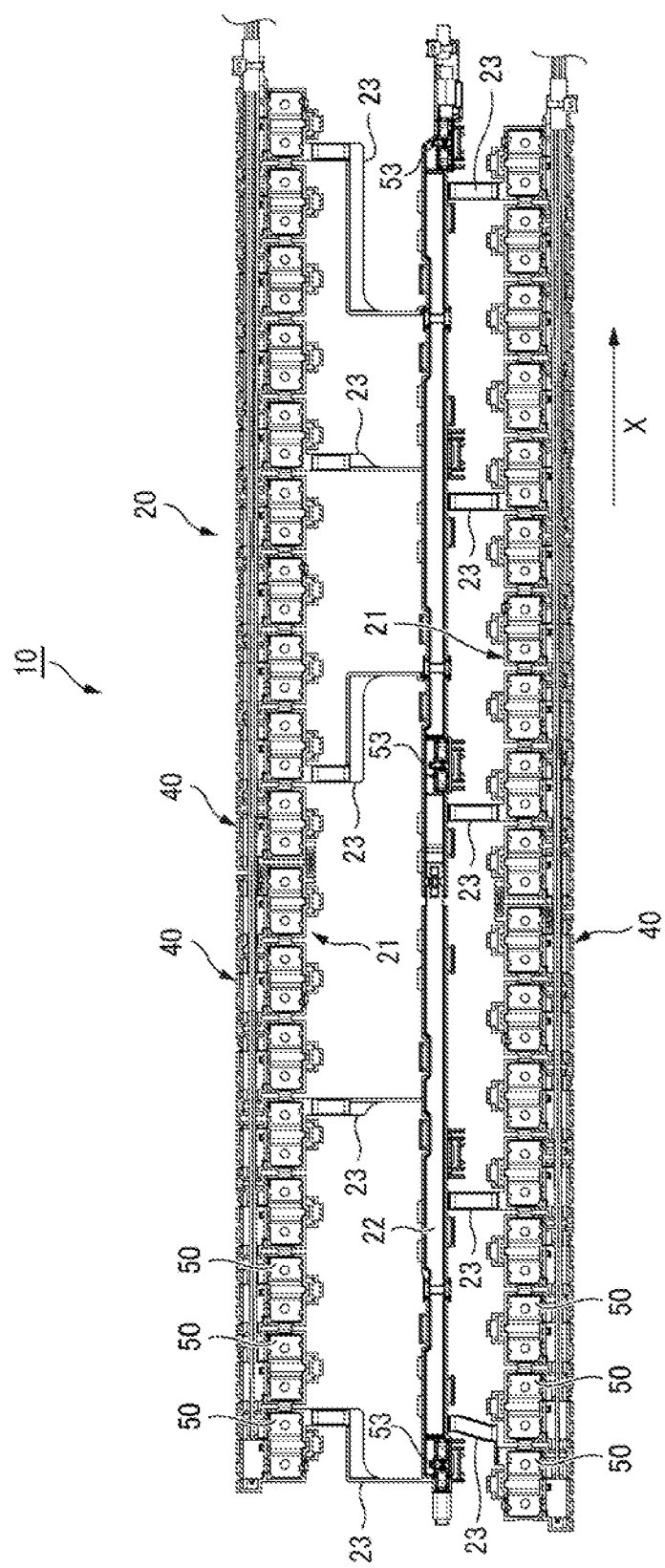
FIG. 2 is a plan view of the busbar module according to the present embodiment.
Figure 3:
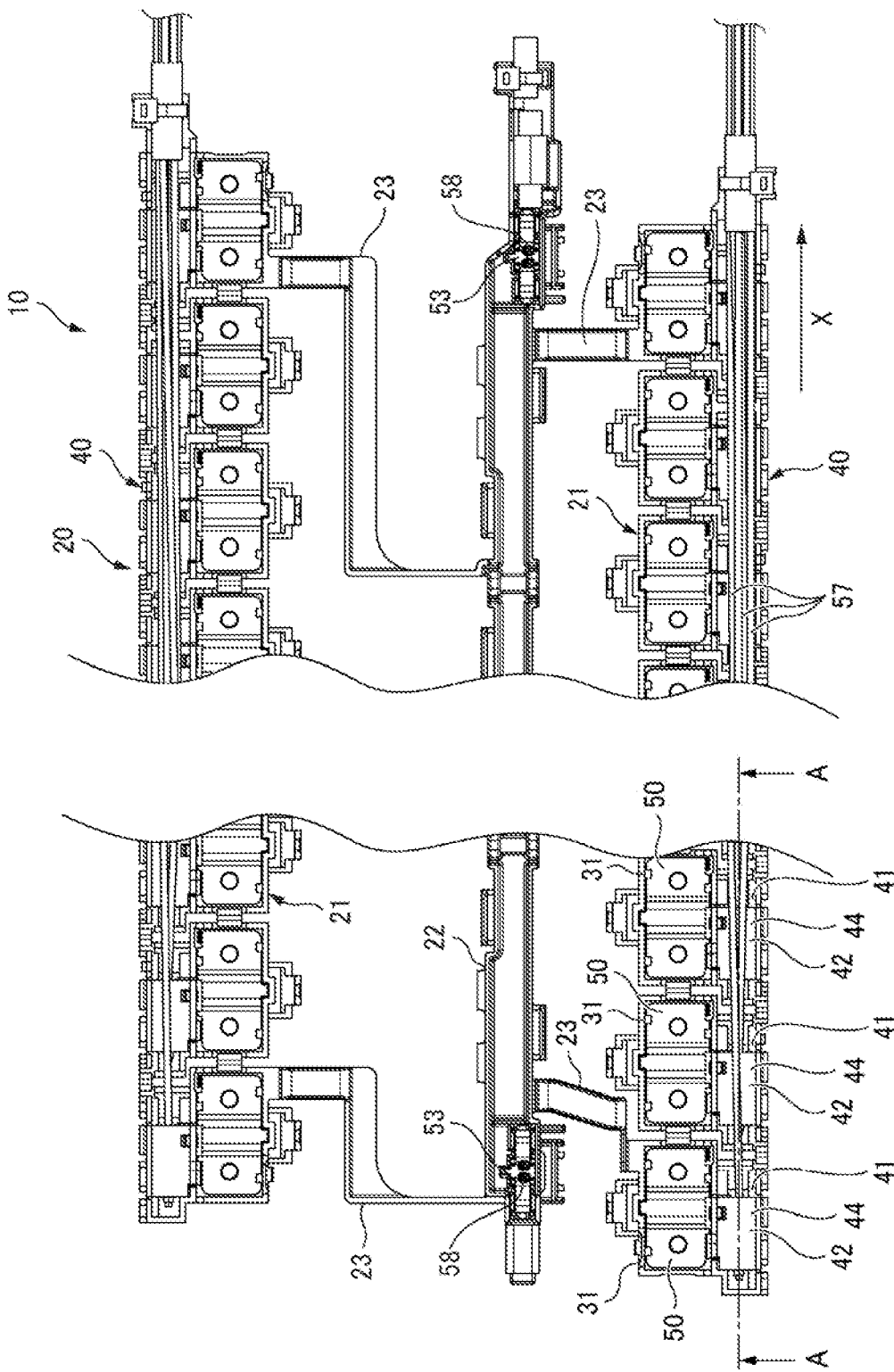
FIG. 3 is an enlarged plan view of the busbar module according to the present embodiment.

Hereinafter, an example of an embodiment according to the present invention will be described with reference to the drawings. FIG. 1 is an exploded perspective view of a busbar module 10 according to an embodiment. FIG. 2 is a plan view of the busbar module 10 according to the present embodiment. FIG. 3 is an enlarged plan view of the busbar module 10 according to the present embodiment.

As shown in FIGS. 1 to 3, the busbar module 10 according to the present embodiment includes a case 20 and a plurality of busbars 50. The busbar module 10 is to be attached to an upper portion of a battery assembly 1 to form a power supply device. The power supply device is used by being mounted on various vehicles such as an electric automobile that travels using an electric motor and a hybrid automobile that travels using an engine and an electric motor in combination, and supplies power to the electric motor.

The battery assembly 1 is an assembled battery including a plurality of single batteries 3 arranged in a row along one direction. Each of the single batteries 3 is formed in a rectangular parallelepiped shape, and includes a pair of electrodes 5 protruding from a vicinity of (near) one end and a vicinity of the other end of an upper face of the single battery 3. One of the pair of electrodes 5 is a positive electrode and the other one is a negative electrode. In the battery assembly 1, poles of the electrodes 5 of the single batteries 3 adjacent to each other are aligned, and the busbar module 10 connects the plurality of single batteries 3 in series by the busbars 50.

The case 20 is integrally molded, using, for example, an insulating synthetic resin or the like. The case 20 has a first end and a second end in a longitudinal direction of the case 20. The case 20 includes two rows of busbar accommodation row portions 21 and an electric wire routing path 22 between the busbar accommodation row portions 21. The busbar accommodation row portions 21 are arranged in two rows along an arrangement direction along which the plurality of single batteries 3 are arranged, i.e., the busbar accommodation row portions 21 extend in the longitudinal direction of the case 20. The two rows of busbar accommodation row portions 21 and the electric wire routing path 22 are coupled (connected) and integrated by coupling portions 23. The electric wire routing path 22 accommodates, for example, an electric wire 58 extending from a thermistor 53 that detects a temperature of the single battery 3.

The case 20 has electric wire routing groove portions 40. The electric wire routing groove portions 40 are provided along the busbar accommodation row portions 21, i.e., along the longitudinal direction of the case 20. In addition, the case 20 includes an accommodation row portion cover 25 and a routing portion cover 26. The accommodation row portion cover 25 is to be attached to an upper portion of the busbar accommodation row portion 21. Accordingly, the upper portion of the busbar accommodation row portion 21 is covered. The routing portion cover 26 is to be attached on an upper portion of the electric wire routing groove portion 40. Accordingly, the upper portion of the electric wire routing groove portion 40 is covered.

The busbar accommodation row portion 21 includes a plurality of busbar accommodation portions 31 arranged in a row. The busbar accommodation portions 31 are formed in a frame shape, and the busbars 50 are to be accommodated in the busbar accommodation portions 31.

The busbar 50 to be accommodated in the busbar accommodation portions 31 is formed by forming a conductive metal material such as copper or a copper alloy into a plate shape, and includes two connection plate portions 52 in which through holes 51 are formed. Each of the connection plate portions 52 is to be fixed and electrically connected to the electrodes 5 of adjacent single batteries 3 with the electrodes 5 being inserted into the through holes 51. The connection plate portion 52 is fixed to the electrode 5 by, for example, fastening with nuts, welding, or the like.

A connection piece 55 is formed on aside portion of the busbar 50. The connection piece 55 extends upward with respect to the connection plate portion 52 of the busbar, and bends and extends in a direction away from the connection plate portion 52, i.e., the connection piece 55 extends in a direction perpendicular to a surface of the connection plate portion 52 and bends toward a direction away from the connection plate portion 52. A terminal portion 56 is formed on an end portion (tip end) of the connection piece 55, and a connection end 57a of an electric wire 57 is connected to the terminal portion 56. The connection end 57a of the electric wire 57 is crimped and fixed to the terminal portion 56, and the electric wire 57 is to be electrically connected to the busbar 50. The electric wire 57 is a voltage detection line for detecting a voltage of the single battery 3, and is drawn out in an electric wire routing direction X (a direction X) orthogonal to an extending direction of the connection piece 55. The electric wire routing direction X is a direction oriented from the second end toward the first end of the case 20.

The busbar 50 is to be attached and accommodated in the busbar accommodation portion 31 from an upper side thereof. In this case, the connection piece 55 extending from the busbar 50 is disposed over the busbar accommodation portion 31 and the electric wire routing groove portion 40, and the terminal portion 56 is disposed on an electric wire routing groove portion 40 side. Then, the electric wire 57 connected to the terminal portion 56 is routed in the electric wire routing groove portion 40. The connection piece 55 is configured to, when the busbars 50 are accommodated in the busbar accommodation portions 31, extend toward the connection end accommodation portion 41.

Figure 4:
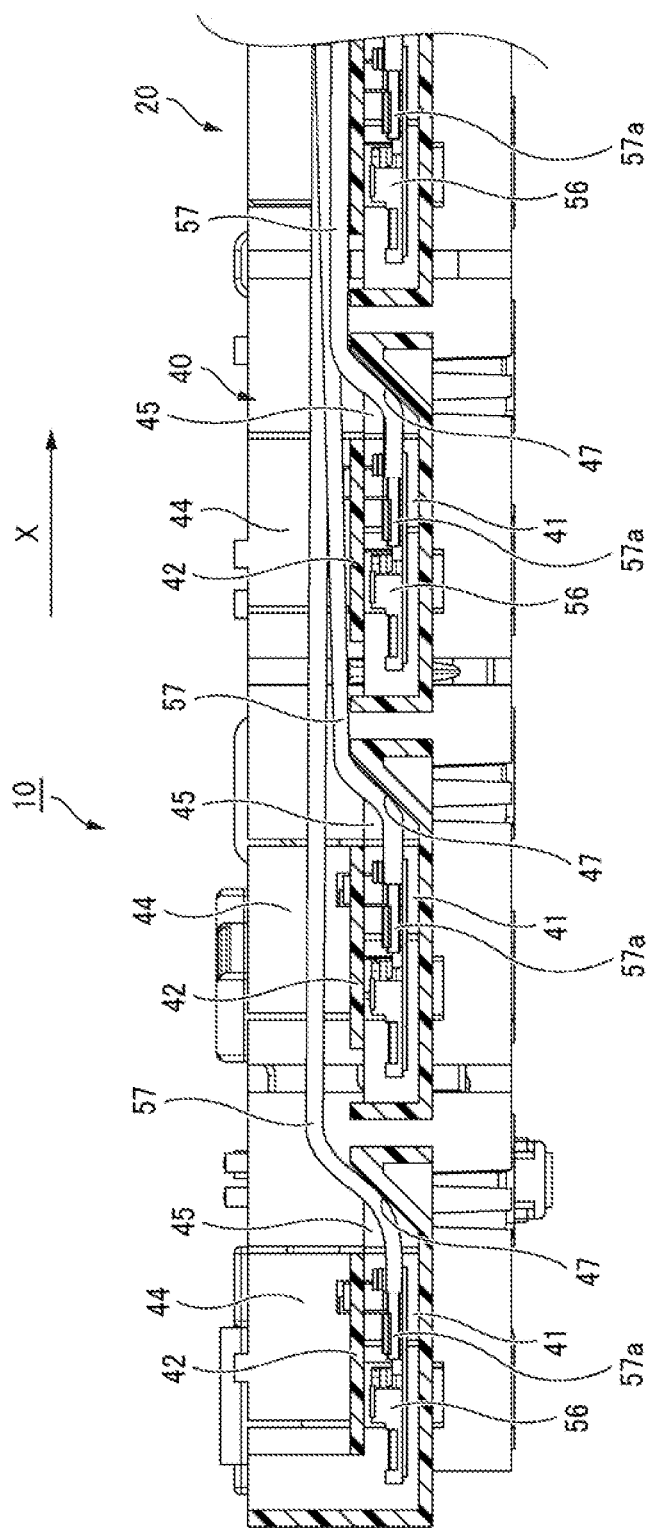
FIG. 4 is a cross-sectional view taken along a line A-A in FIG. 3.

FIG. 4 is a cross-sectional view taken along a line A-A in FIG. 3. As shown in FIG. 4, the electric wire routing groove portion 40 includes a connection end accommodation portion 41 and an accommodation portion cover 42 corresponding to each of the busbar accommodation portions 31. The connection end accommodation portion 41 and an accommodation portion cover 42 are provided next to respective busbar accommodation portions 31. The connection end accommodation portion 41 is formed in a concave shape recessed downward, and the connection end 57a of the electric wire 57 connected to the terminal portion 56 on the end portion of the connection piece 55 of the busbar 50 is accommodated in the connection end accommodation portion 41. The connection end 57a of the present embodiment is formed of a relay terminal crimped to a conductor exposed at an end of the electric wire 57. The accommodation portion cover 42 is rotatably coupled to a side wall of the connection end accommodation portion 41 on an opposite side to the busbar accommodation portion 31, and an upper portion of the connection end accommodation portion 41 is opened and closed by the accommodation portion cover 42 by being rotated at a coupling portion with the side wall. By closing the connection end accommodation portion 41 with the accommodation portion cover 42, the upper portion of the connection end accommodation portion 41 in which the connection end 57a of the electric wire 57 is accommodated is covered, and a routing path 44 having the accommodation portion cover 42 as a bottom surface is formed above the connection end accommodation portion 41. In other words, the accommodation portion cover 42 is provided on the connection end accommodation portion 41 in an openable and closable manner with respect to the connection end accommodation portion 41 and configured to cover the upper portion (upper opening) of the connection end accommodation portion 41. When the accommodation portion cover 42 covers (closes) the upper portion of the connection end accommodation portion 41, an outer surface of the accommodation portion cover 42 form a bottom surface of the routing path 44. The routing path 44 is configured such that each of the plurality of electric wires 57 drawn out from the connection end accommodation portion 41 extend in the routing path 44.

In the connection end accommodation portion 41, an electric wire lead-out portion 45 is provided on a side of the electric wire routing direction X of the electric wire 57, and the electric wire 57 connected to the terminal portion 56 in the connection end accommodation portion 41 is led out from the electric wire lead-out portion 45. In other words, the electric wire lead-out portion 45 is provided on an end of the connection end accommodation portion 41 in the direction X and configured such that each of the plurality of electric wires 57 is drawn out from the connection end accommodation portion 41 toward the direction X with the connection end 57a being accommodated in the connection end accommodation portion 41. The electric wire 57 led out from the electric wire lead-out portion 45 is passed through/in the routing path 44 on an upper surface of the accommodation portion cover 42 closing the connection end accommodation portion 41 on the electric wire routing direction X side. That is, the upper portion of the connection end accommodation portion 41 covered by the accommodation portion cover 42 serves as the routing path 44 through which the electric wire 57 drawn out from the connection end accommodation portion 41 is passed.

The electric wire lead-out portion 45 of the connection end accommodation portion 41 has a guide surface 47. The guide surface 47 is formed so as to have a gradient inclined upward gradually toward the electric wire routing direction X of the electric wire 57 (toward the first end of the case 20). Accordingly, the electric wire 57 drawn out from the electric wire lead-out portion 45 of the connection end accommodation portion 41 is guided to the routing path 44 above the connection end accommodation portion 41 which is provided further on the electric wire routing direction X side by the guide surface 47. In other words, the connection end accommodation portion 41 includes a first connection end accommodation portion 41 and a second connection end accommodation portion 41. The first connection end accommodation portion 41 is adjacent to the second connection end accommodation portion 41 in the longitudinal direction of the case 20 and provided closer to the first end of the case 20 than the second connection end accommodation portion 41. The electric wire lead-out portion 45 includes a first electric wire lead-out portion 45 and a second electric wire lead-out portion 45. The first electric wire lead-out portion 45 is provided on one end of the first connection end accommodation portion 41 in the electric wire routing direction X. The second electric wire lead-out portion 45 is provided on one end of the second connection end accommodation portion 41 in the electric wire routing direction X. The second electric wire lead-out portion 45 includes the guide surface 47 having a gradient configured to guide one of the plurality of electric wires 57, the one being drawn out from the second connection end accommodation portion 41, to the routing path 44 in which the outer surface of the accommodation portion cover 42 covering the upper portion of the first connection end accommodation portion 41 forms the bottom surface, i.e., the routing path 44 above the first connection end accommodation portion 41.

Figure 5A:
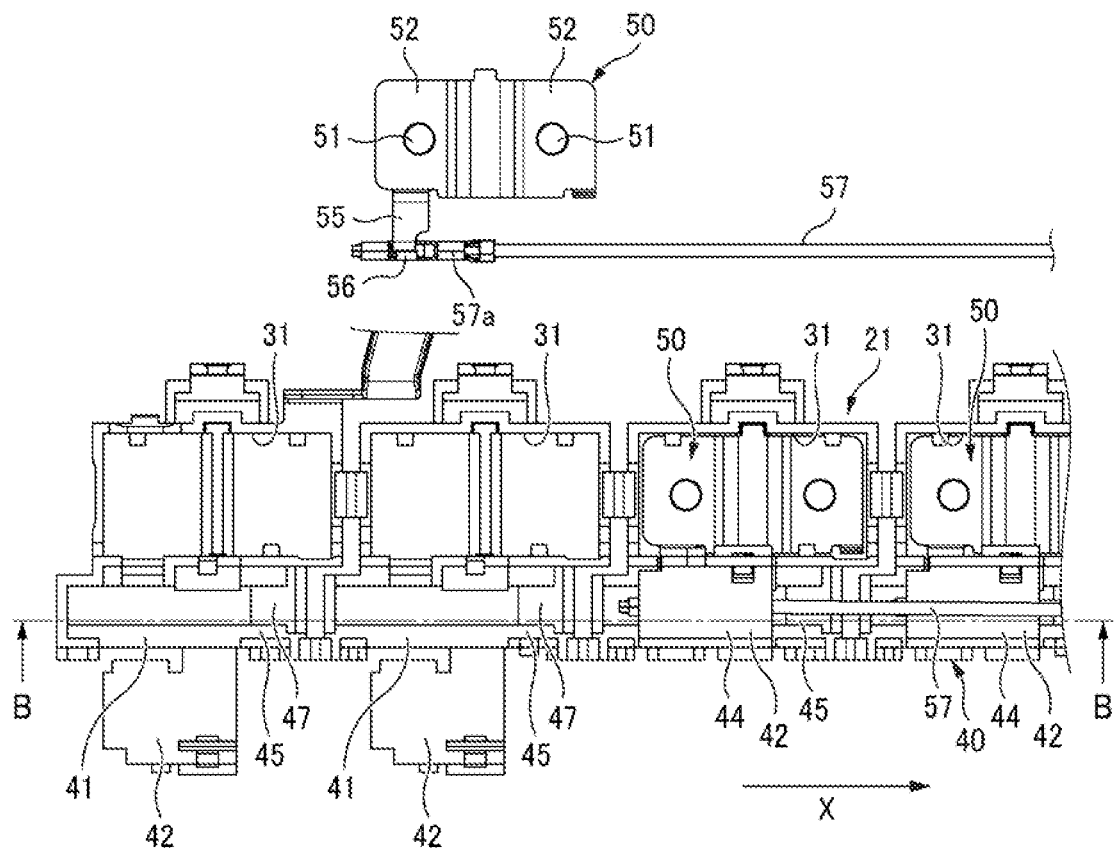
Figure 5B:
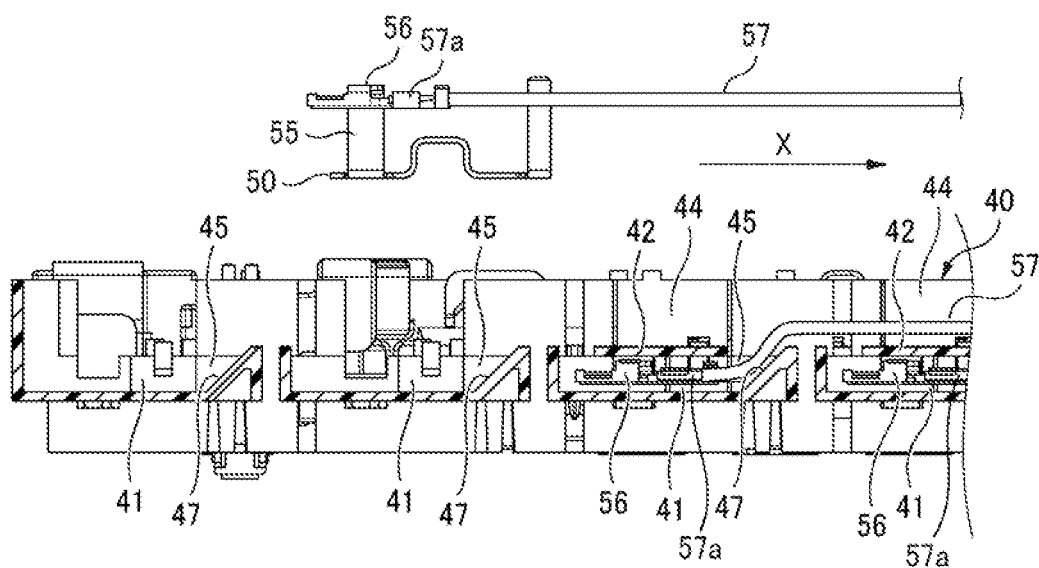
Figure 6A:
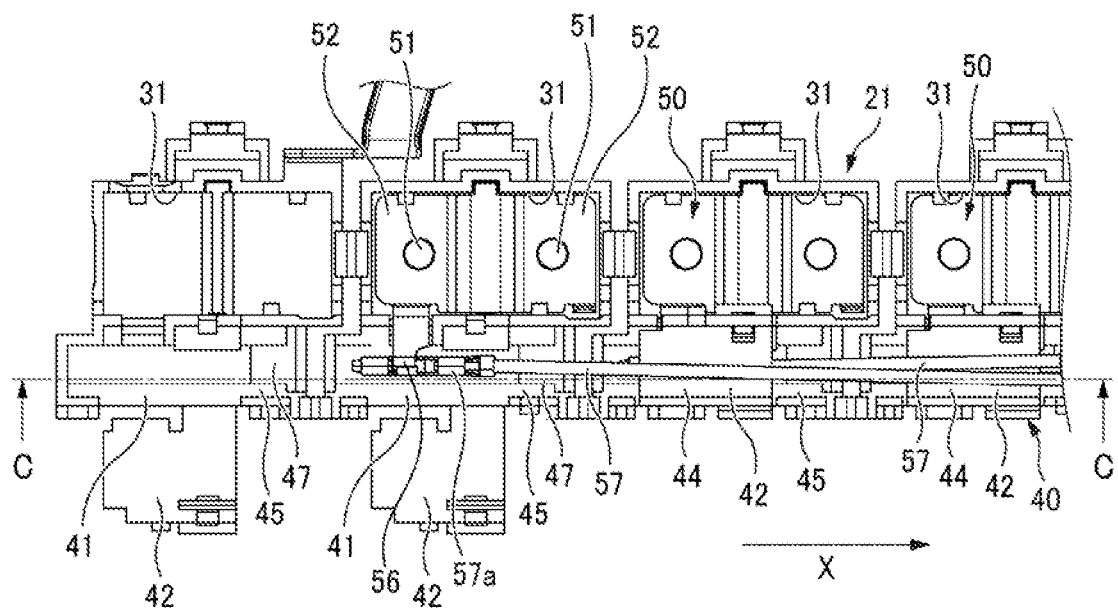
Figure 6B:
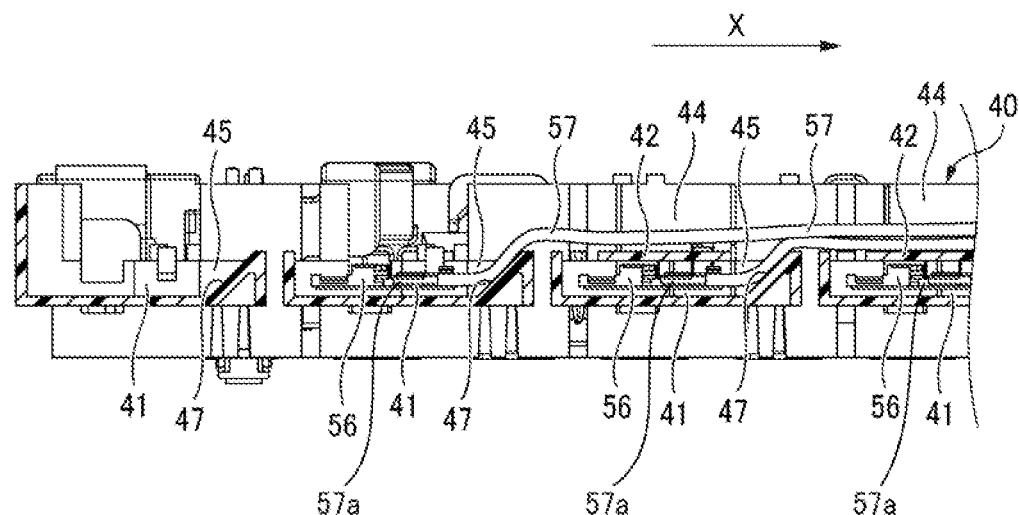
Figure 7A:
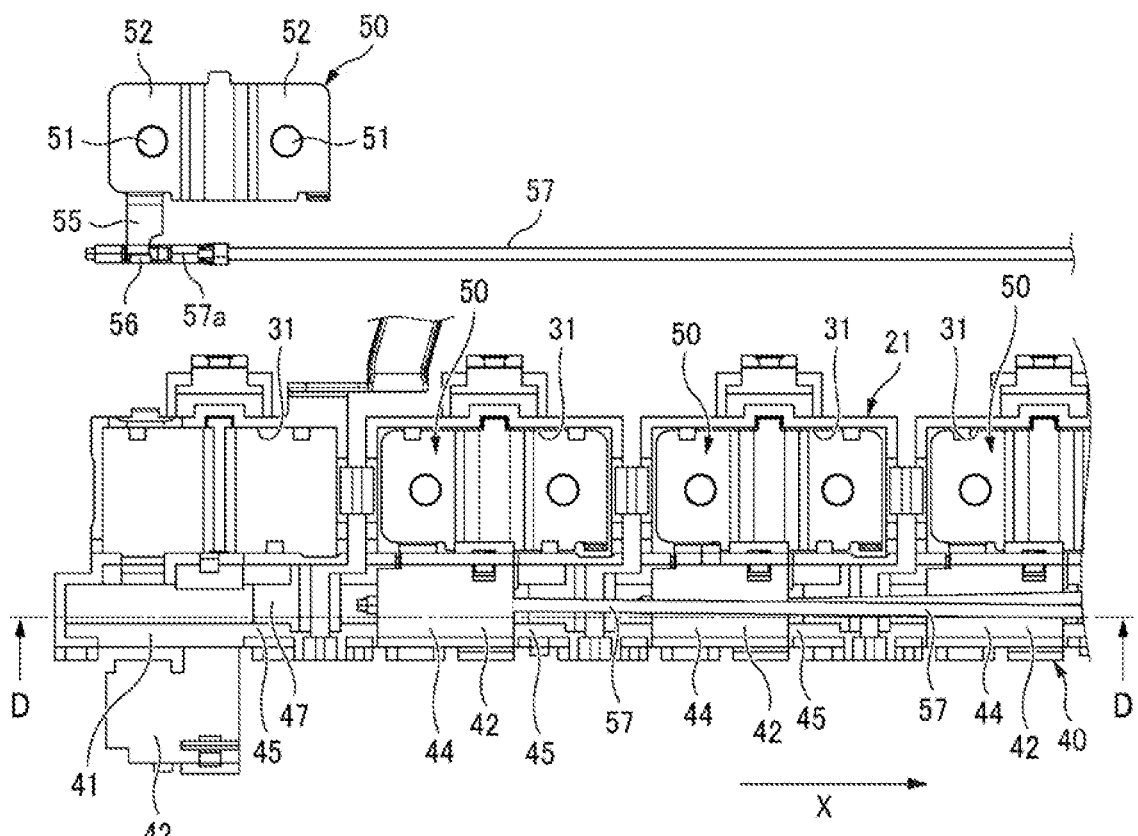
Figure 7B:
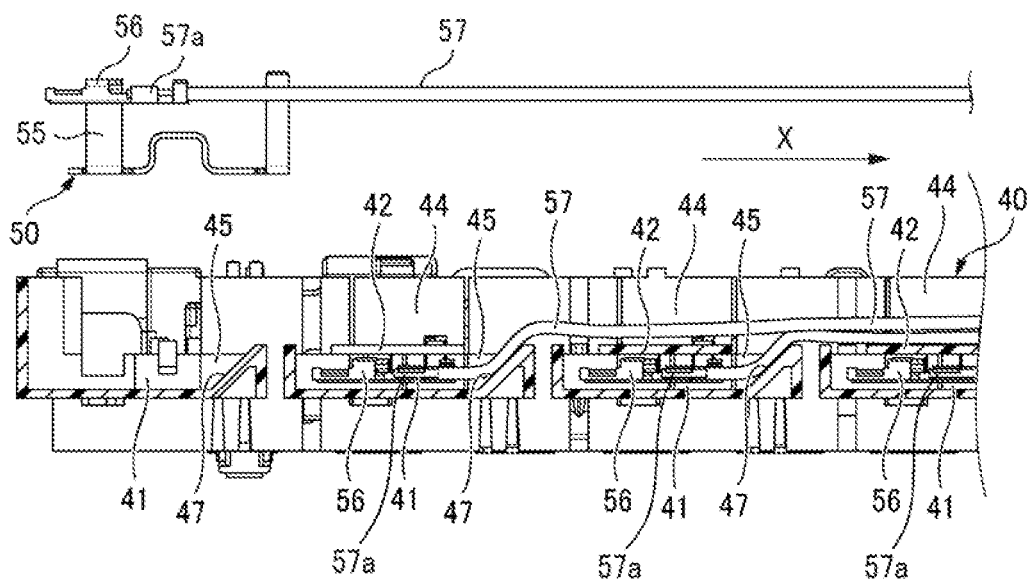

Next, an attaching operation of attaching the busbar 50 to the busbar accommodation row portion 21 of the case 20 and routing the electric wire 57 will be described. FIGS. 5A and 5B are diagrams showing an attaching operation of the busbar 50 to the busbar accommodation portion 31 of the case 20, in which FIG. 5A is a plan view of the case 20, and FIG. 5B is a cross-sectional view taken along a line B-B in FIG. 5A. FIGS. 6A and 6B are diagrams showing an attaching operation of the busbar 50 to the busbar accommodation portion 31 of the case 20, in which FIG. 6A is a plan view of the case 20, and FIG. 6B is a cross-sectional view taken along a line C-C in FIG. 6A. FIGS. 7A and 7B are diagrams showing an attaching operation of the busbar 50 to the busbar accommodation portion 31 of the case 20, in which FIG. 7A is a plan view of the case 20, and FIG. 7B is a cross-sectional view taken along a line D-D in FIG. 7A.

As shown in FIGS. 5A and 5B, when the busbar 50 is attached to the case 20, the busbar 50 is attached to the busbar accommodation portion 31 in order from an upstream which is the electric wire routing direction X side (a side of the first end of the case 20) in the busbar accommodation row portion 21. In other words, the busbar 50 closer to the first end of the case 20 is attached first among others. When the busbar 50 is attached from above and accommodated in the busbar accommodation portion 31 in which the accommodation portion cover 42 is opened, the terminal portion 56 of the connection piece 55 of the busbar 50 is disposed in the connection end accommodation portion 41 in the electric wire routing groove portion 40, and the connection end 57a of the electric wire 57 is accommodated in the connection end accommodation portion 41.

As shown in FIGS. 6A and 6B, when the busbar 50 is attached to the busbar accommodation portion 31, the electric wire 57 having the connection end 57a connected to the terminal portion 56 is accommodated in the routing path 44 formed above the connection end accommodation portion 41 further on the electric wire routing direction X side (or above the connection end accommodation portion 41 closer to the first end of the case 20) in the electric wire routing groove portion 40. At this time, the electric wire 57 is smoothly guided to the routing path 44 further on the electric wire routing direction X side along the guide surface 47 of the electric wire lead-out portion 45 of the connection end accommodation portion 41.

As shown in FIGS. 7A and 7B, the accommodation portion cover 42 is closed to close the connection end accommodation portion 41 accommodating the connection end 57a of the electric wire 57. In this case, the connection end 57a is protected by the accommodation portion cover 42, and the routing path 44 having the accommodation portion cover 42 as the bottom surface is formed above the connection end accommodation portion 41.

Thereafter, by repeating the above operation, the busbars 50 are accommodated in all the busbar accommodation portions 31 of the busbar accommodation row portion 21, and the electric wire 57 connected to the terminal portion 56 is routed in the electric wire routing groove portion 40. The electric wire 57 is not routed in the routing path 44 formed above the connection end accommodation portion 41 corresponding to the most downstream busbar accommodation portion 31, i.e., the busbar accommodation portion 31 closest to the second end of the case 20.

As described above, according to the busbar module 10 of the present embodiment, the connection end 57a of the electric wire 57 is accommodated in the connection end accommodation portion 41 provided in the electric wire routing groove portion 40. In a state where the connection end accommodation portion 41 is covered and closed by the accommodation portion cover 42, the upper portion of the connection end accommodation portion 41 forms the routing path 44 of the electric wire 57 drawn out from the connection end accommodation portion 41 provided closer to the second end of the case 20. Therefore, in the electric wire routing groove portion 40, an accommodation operation of the connection end 57a of the electric wire 57 in the connection end accommodation portion 41 and a closing operation of the connection end accommodation portion 41 by the accommodation portion cover 42 are performed in order from the upstream which is the electric wire routing direction X side, so that a routing operation of the electric wire 57 can be easily performed. Accordingly, as compared with a busbar module having a structure in which an accommodation portion of the connection end 57a is disposed at a position shifted from the electric wire routing groove portion 40 in a plan view, it is possible to omit a bending operation of the electric wire 57 while reducing a width dimension of the case 20 and reducing a size of the case 20. Therefore, it is possible to reduce time and effort required for the routing operation of the electric wire 57 and to shorten a routing operation time. In addition, since the bending operation of the electric wire 57 can be omitted, the routing operation of the electric wire 57 to the electric wire routing groove portion 40 can be easily automated. In addition, since the connection end 57a of the electric wire 57 is accommodated in the connection end accommodation portion 41 covered by the accommodation portion cover 42, the connection end 57a of the electric wire 57 can be protected, and interference between the connection end 57a and another electric wire 57 can be avoided.

In addition, the electric wire lead-out portion 45 of the present embodiment includes the guide surface 47 having the gradient at which the electric wire 57 drawn out from the connection end accommodation portion 41 is guided to the routing path 44 above the connection end accommodation portion 41 disposed further in the electric wire routing direction X. Therefore, the electric wire 57 whose connection end 57a is accommodated in the connection end accommodation portion 41 is drawn out along the guide surface 47 having the gradient and is easily routed to the routing path 44 disposed above the connection end accommodation portion 41 further in the electric wire routing direction X.

In addition, the busbar 50 of the present embodiment has the connection piece 55 which extends toward the connection end accommodation portion 41 of the electric wire routing groove portion 40 when the busbar 50 is accommodated in the busbar accommodation portion 31 and to which the connection end 57a is crimped and connected at the end portion of the connection piece 55. The end portion of the connection piece 55 is to be accommodated in the connection end accommodation portion 41 when the busbar 50 is accommodated in the busbar accommodation portion 31. Therefore, by accommodating the busbar 50 in the busbar accommodation portion 31 of the case 20, the connection end 57a of the electric wire 57 crimped to the connection piece 55 of the busbar 50 can be accommodated in the connection end accommodation portion 41 of the electric wire routing groove portion 40, and routing workability can be further improved.

In the above embodiment, the two rows of busbar accommodation row portions 21 are coupled to the electric wire routing path 22 by the coupling portion 23 to be integrated with each other, but the busbar accommodation row portion 21 may be a separated portion from another busbar accommodation row portions 21 or the electric wire routing path 22.

In the above embodiment, the electric wire 57, which is a voltage detection line, has the connection end 57a, which is a relay terminal, connected to the terminal portion 56 of the connection piece 55 formed on the busbar 50, but the present invention is not limited thereto. For example, the connection end (exposed conductor) of the electric wire 57 may be electrically connected to a connection piece of a terminal plate for voltage detection, and the terminal plate may be overlapped with the busbar 50 to be electrically connected to the electrode 5 of the single battery 3.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, a busbar module (10) includes a case (20) to be attached to a battery assembly (1) including a plurality of single batteries (3), the case (20) having a first end and a second end in a longitudinal direction of the case (20), a plurality of busbars (50) supported by the case (20) and configured to be connected to electrodes (5) of the plurality of single batteries (3) and a plurality of electric wires (57) each having a connection end (57a) configured to be electrically connected to each of the plurality of busbars (50). The case (20) includes a busbar accommodation row portion (21) in which a plurality of busbar accommodation portions (31) each configured to accommodate each of the plurality of busbars (50) are arranged in a row along the longitudinal direction and an electric wire routing groove portion (40) extending along the busbar accommodation row portion (21) and configured to accommodate at least one of the plurality of electric wires (57) such that the at least one of the plurality of electric wires (57) is routed toward a direction (X) oriented from the second end toward the first end of the case (20). The electric wire routing groove portion (40) includes a connection end accommodation portion (41) having a concave shape and configured to accommodate the connection end (57a), an accommodation portion cover (42) provided on the connection end accommodation portion (41) in an openable and closable manner with respect to the connection end accommodation portion (41) and configured to cover an upper portion of the connection end accommodation portion (41) and an electric wire lead-out portion (45) provided on an end of the connection end accommodation portion (41) in the direction (X) and configured such that each of the plurality of electric wires (57) is drawn out from the connection end accommodation portion (41) toward the direction with the connection end (57a) being accommodated in the connection end accommodation portion (41). An outer surface of the accommodation portion cover (42) is configured to, when the accommodation portion cover (42) covers the upper portion of the connection end accommodation portion (41), form a bottom surface of a routing path (44), the routing path (44) being configured such that each of the plurality of electric wires (57) drawn out from the connection end accommodation portion (41) extends in the routing path (44).

According to the busbar module having above described configuration, the connection end of the electric wire with the busbar is accommodated in the connection end accommodation portion provided in the electric wire routing groove portion. In a state where the connection end accommodation portion is covered and closed by the accommodation portion cover, the upper portion of the connection end accommodation portion forms the routing path for the electric wire drawn out from the connection end accommodation portion toward the electric wire routing direction (a direction). Therefore, in the electric wire routing groove portion, an accommodation operation of the connection end of the electric wire in the connection end accommodation portion and a closing operation of the connection end accommodation portion by the accommodation portion cover are performed in order from an upstream which is the electric wire routing direction side (a side at which the first end of the case is provided), so that a routing operation of the electric wire can be easily performed. Accordingly, as compared with a busbar module having a structure in which an accommodation portion of the connection end is disposed at a position shifted from the electric wire routing groove portion in a plan view so that the electric wire on a downstream does not interfere with the connection end of the electric wire on the upstream, it is possible to omit a bending operation of the electric wire while reducing a width dimension of the case and reducing a size of the case. Therefore, it is possible to reduce time and effort required for the routing operation of the electric wire and to shorten a routing operation time. In addition, since the bending operation of the electric wire can be omitted, the routing operation of the electric wire to the electric wire routing groove portion can be easily automated. In addition, since the connection end of the electric wire is accommodated in the connection end accommodation portion covered by the accommodation portion cover, the connection end of the electric wire can be protected, and interference between the connection end and another electric wire can be avoided.

The connection end accommodation portion (41) may be a plurality of connection end accommodation portions (41) including a first connection end accommodation portion (41) and a second connection end accommodation portion (41). The electric wire lead-out portion (45) may include a guide surface (47) having a gradient at which one of the plurality electric wires (57) drawn out from the second connection end accommodation portion (41) is guided to the routing path (44) formed above the first connection end accommodation portion (41) provided further in the direction (X) than the second connection end accommodation portion (41).

With this configuration, the electric wire whose connection end is accommodated in the connection end accommodation portion is drawn out along the guide surface having the gradient and is easily routed to the routing path above the connection end accommodation portion further in the electric wire routing direction side.

Each of the plurality of busbars (50) may include a connection piece (55) configured to, when the plurality of busbars (50) are accommodated in the busbar accommodation portions (31), extend toward the connection end accommodation portion (41) and configured such that the connection end (57a) is crimped and connected at an end portion of the connection piece (55). The end portion of the connection piece (55) may be configured to be accommodated in the connection end accommodation portion (41).

With this configuration, by accommodating the busbar in the busbar accommodation portion of the case, the connection end of the electric wire crimped to the connection piece of the busbar can be accommodated in the connection end accommodation portion of the electric wire routing groove portion, and routing workability can be further improved.

The connection end accommodation portion (41) may be a plurality of connection end accommodation portions (41) including a first connection end accommodation portion (41) and a second connection end accommodation portion (41), the first connection end accommodation portion (41) being adjacent to the second connection end accommodation portion (41) in the longitudinal direction and provided closer to the first end of the case (20) than the second connection end accommodation portion (41). The electric wire lead-out portion (45) may be a plurality of electric wire lead-out portions (45) including a first electric wire lead-out portion (45) and a second electric wire lead-out portion (45) respectively provided in the first connection end accommodation portion (41) and the second connection end accommodation portion (41). The second electric wire lead-out portion (45) of the second connection end accommodation portion (41) may include a guide surface (47) having a gradient configured to guide one of the plurality of electric wires (57), the one being drawn out from the second connection end accommodation portion (41), to the routing path (44) in which the outer surface of the accommodation portion cover (42) covering the upper portion of the first connection end accommodation portion (41) forms the bottom surface.

What is claimed is:

1. A busbar module comprising:
   a case to be attached to a battery assembly including a plurality of single batteries, the case having a first end and a second end in a longitudinal direction of the case;
   a plurality of busbars supported by the case and configured to be connected to electrodes of the plurality of single batteries; and
   a plurality of electric wires each having a connection end configured to be electrically connected to each of the plurality of busbars,
   wherein the case includes:
   a busbar accommodation row portion in which a plurality of busbar accommodation portions each configured to accommodate each of the plurality of busbars are arranged in a row along the longitudinal direction; and
   an electric wire routing groove portion extending along the busbar accommodation row portion and configured to accommodate at least one of the plurality of electric wires such that the at least one of the plurality of electric wires is routed toward a direction oriented from the second end toward the first end of the case,
   wherein the electric wire routing groove portion includes:
   a connection end accommodation portion having a concave shape and configured to accommodate the connection end;
   an accommodation portion cover provided on the connection end accommodation portion in an openable and closable manner with respect to the connection end accommodation portion and configured to cover an upper portion of the connection end accommodation portion; and
   an electric wire lead-out portion provided on an end of the connection end accommodation portion in the direction and configured such that each of the plurality of electric wires is drawn out from the connection end accommodation portion toward the direction with the connection end being accommodated in the connection end accommodation portion,
   wherein an outer surface of the accommodation portion cover is configured to, when the accommodation portion cover covers the upper portion of the connection end accommodation portion, form a bottom surface of a routing path, the routing path being configured such that each of the plurality of electric wires drawn out from the connection end accommodation portion extends in the routing path.

2. The busbar module according to claim 1,
wherein the connection end accommodation portion is a plurality of connection end accommodation portions including a first connection end accommodation portion and a second connection end accommodation portion, and
wherein the electric wire lead-out portion includes a guide surface having a gradient at which one of the plurality electric wires drawn out from the second connection end accommodation portion is guided to the routing path formed above the first connection end accommodation portion provided further in the direction than the second connection end accommodation portion.

3. The busbar module according to claim 1,
wherein each of the plurality of busbars includes a connection piece configured to, when the plurality of busbars are accommodated in the busbar accommodation portions, extend toward the connection end accommodation portion and configured such that the connection end is crimped and connected at an end portion of the connection piece, and
wherein the end portion of the connection piece is configured to be accommodated in the connection end accommodation portion.

4. The busbar module according to claim 1,
wherein the connection end accommodation portion is a plurality of connection end accommodation portions including a first connection end accommodation portion and a second connection end accommodation portion, the first connection end accommodation portion being adjacent to the second connection end accommodation portion in the longitudinal direction and provided closer to the first end of the case than the second connection end accommodation portion,
wherein the electric wire lead-out portion is a plurality of electric wire lead-out portions including a first electric wire lead-out portion and a second electric wire lead-out portion respectively provided in the first connection end accommodation portion and the second connection end accommodation portion, and
wherein the second electric wire lead-out portion of the second connection end accommodation portion includes a guide surface having a gradient configured to guide one of the plurality of electric wires, the one being drawn out from the second connection end accommodation portion, to the routing path in which the outer surface of the accommodation portion cover covering the upper portion of the first connection end accommodation portion forms the bottom surface.

* * * * *